US009235230B1

(12) United States Patent (10) Patent No.: US 9,235,230 B1
Tarnow et al. (45) Date of Patent: Jan. 12, 2016

(54) MAGNETIC STAND, MOUNT AND CORD WRAP FOR MOBILE DEVICES AND ACCESSORIES

(75) Inventors: Derek Tarnow, Chicago, IL (US); Zahra Tashakorinia, Chicago, IL (US)

(73) Assignee: Logitech Europe S.A., Lausanne (CH)

( * ) Notice: Subject to any disclaimer, the term of this patent is extended or adjusted under 35 U.S.C. 154(b) by 265 days.

(21) Appl. No.: 13/610,728

(22) Filed: Sep. 11, 2012

Related U.S. Application Data

(60) Provisional application No. 61/584,736, filed on Jan. 9, 2012.

(51) Int. Cl.
*G06F 1/16* (2006.01)
*B65D 25/24* (2006.01)

(52) U.S. Cl.
CPC .. *G06F 1/16* (2013.01); *B65D 25/24* (2013.01)

(58) Field of Classification Search
CPC ....... G06F 1/16; G06F 1/1613; G06F 1/1626; G06F 1/1656; G06F 2200/1633
USPC ........ 248/371, 441.1, 460, 309.1, 346.3, 917; 248/459, 454, 206.5, 309.4, 683; 206/320, 206/45.23, 45.24, 764, 719, 721, 751, 818; 361/679.55, 683, 681; 335/219, 285
See application file for complete search history.

(56) References Cited

U.S. PATENT DOCUMENTS

| | | | |
|---|---|---|---|
| 4,475,649 A | 10/1984 | Haarbosch | |
| 5,682,653 A | 11/1997 | Berglof et al. | |
| 5,996,778 A | 12/1999 | Shih | |
| 6,450,328 B1 | 9/2002 | Machacek et al. | |
| 6,700,775 B1 | 3/2004 | Chuang et al. | |
| D556,019 S | 11/2007 | Symons | |
| 7,545,634 B2 | 6/2009 | Simonian et al. | |
| 7,575,189 B2 | 8/2009 | Shirazi | |
| 7,845,612 B2 | 12/2010 | Mase | |
| D636,659 S | 4/2011 | Rothbaum et al. | |
| D645,333 S | 9/2011 | Rothbaum et al. | |
| 8,143,982 B1 | 3/2012 | Lauder et al. | |
| 8,253,518 B2 * | 8/2012 | Lauder et al. | 335/219 |
| 8,281,924 B2 * | 10/2012 | Westrup | 206/320 |
| 8,312,991 B2 | 11/2012 | Diebel et al. | |
| 8,328,008 B2 | 12/2012 | Diebel et al. | |
| 2004/0240164 A1 * | 12/2004 | Lee | 361/683 |
| 2007/0023559 A1 | 2/2007 | Scapillato et al. | |
| 2007/0154048 A1 | 7/2007 | Chang | |
| 2007/0165371 A1 | 7/2007 | Brandenburg | |
| 2007/0263350 A1 | 11/2007 | Lin et al. | |
| 2009/0013504 A1 | 1/2009 | Crespo | |
| 2009/0036175 A1 | 2/2009 | Brandenburg et al. | |
| 2010/0155550 A1 | 6/2010 | Weiss-Vons | |

(Continued)

*Primary Examiner* — Tan Le
(74) *Attorney, Agent, or Firm* — Kilpatrick Townsend & Stockton LLP

(57) ABSTRACT

A mobile device accessory can function as a cord organizer, a case for accessories and a stand for the device. The accessory is sized to conform to the size and perimeter of the mobile device. The accessory has a case frame and a foldable flat panel that can form a triangular tube having a triangular profile. The panel includes outer layers of material and a central layer of panel members that is constructed with magnets along the perimeter. The outer material is a natural, synthetic or composite elastomeric polymer and can be provided with a textured finish. In other embodiments, the tube describes a square or other polygonal shape in profile. The triangular tube can be used to store and/or organize mobile device cords. The triangular tube can become a support prop to hold the mobile device upright.

2 Claims, 8 Drawing Sheets

(56) References Cited

U.S. PATENT DOCUMENTS

| | | |
|---|---|---|
| 2010/0224714 A1 | 9/2010 | Winther et al. |
| 2010/0300909 A1 | 12/2010 | Hung |
| 2011/0170732 A1 | 7/2011 | Parker et al. |
| 2011/0192857 A1 | 8/2011 | Rothbaum et al. |
| 2011/0203954 A1 | 8/2011 | Kroupa |
| 2011/0252605 A1 | 10/2011 | Rothbaum et al. |
| 2011/0252606 A1 | 10/2011 | Rothbaum et al. |
| 2011/0252607 A1 | 10/2011 | Rothbaum et al. |
| 2011/0252608 A1 | 10/2011 | Rothbaum et al. |
| 2011/0252609 A1 | 10/2011 | Rothbaum et al. |
| 2011/0253571 A1 | 10/2011 | Rothbaum |
| 2011/0290687 A1* | 12/2011 | Han .............................. 206/320 |
| 2011/0317865 A1 | 12/2011 | Stevinson |
| 2012/0024918 A1 | 2/2012 | DeCamp et al. |
| 2012/0025684 A1 | 2/2012 | Trotsky |
| 2012/0044638 A1* | 2/2012 | Mongan et al. .......... 361/679.55 |
| 2012/0268891 A1* | 10/2012 | Cencioni .................. 361/679.55 |
| 2013/0048520 A1* | 2/2013 | Garrett et al. ................. 206/320 |
| 2013/0126365 A1* | 5/2013 | Hung ........................ 206/45.24 |
| 2014/0246340 A1* | 9/2014 | Jiang et al. ................. 206/45.23 |

* cited by examiner

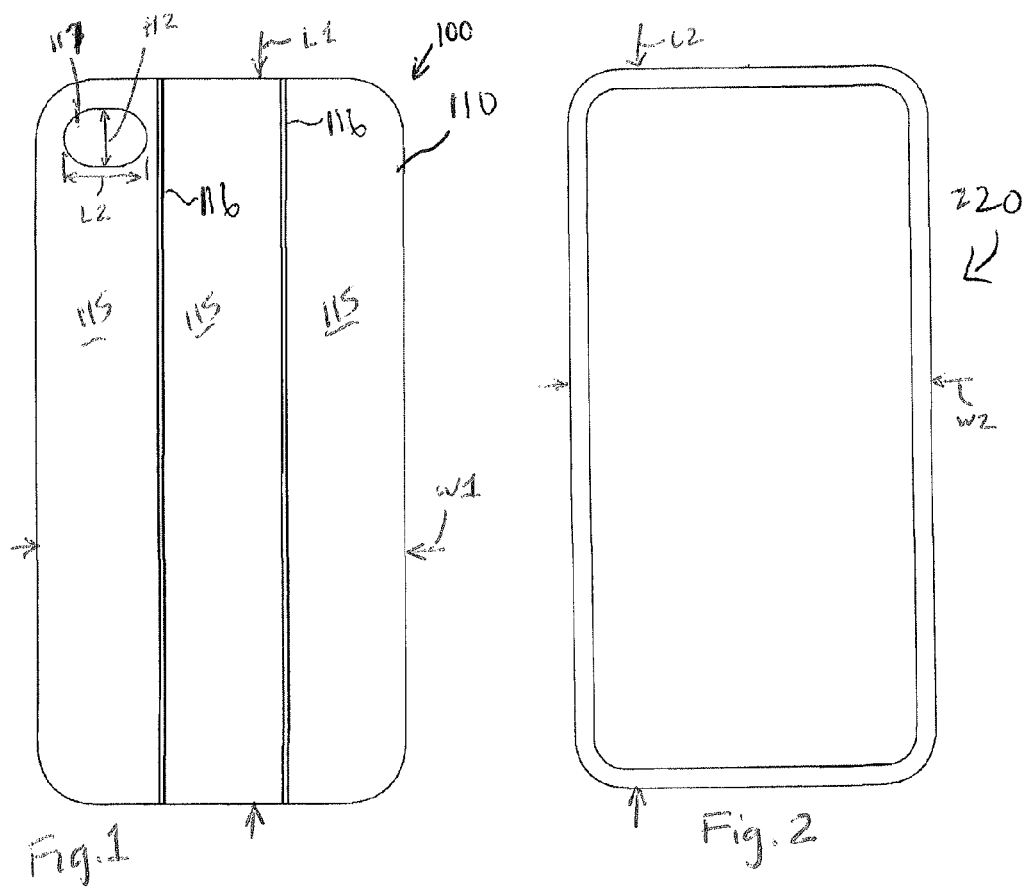
Fig. 1
Fig. 2
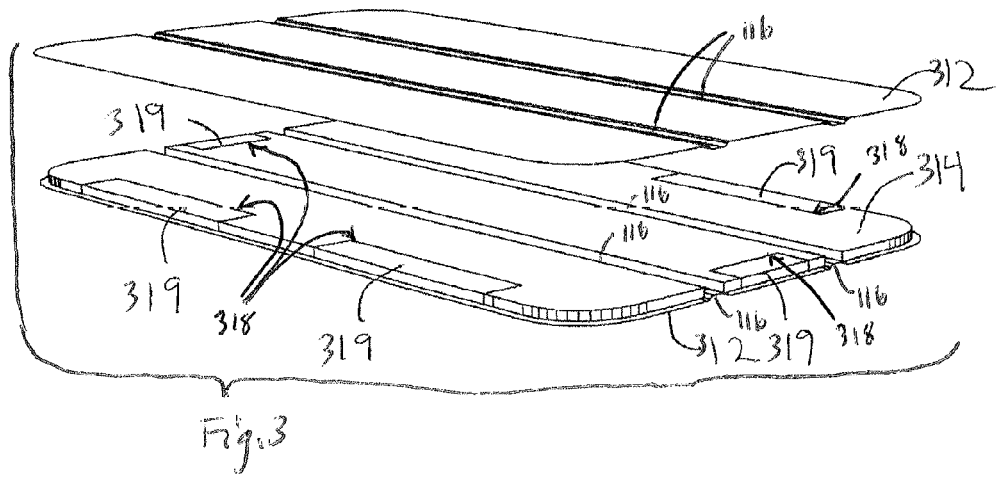
Fig. 3

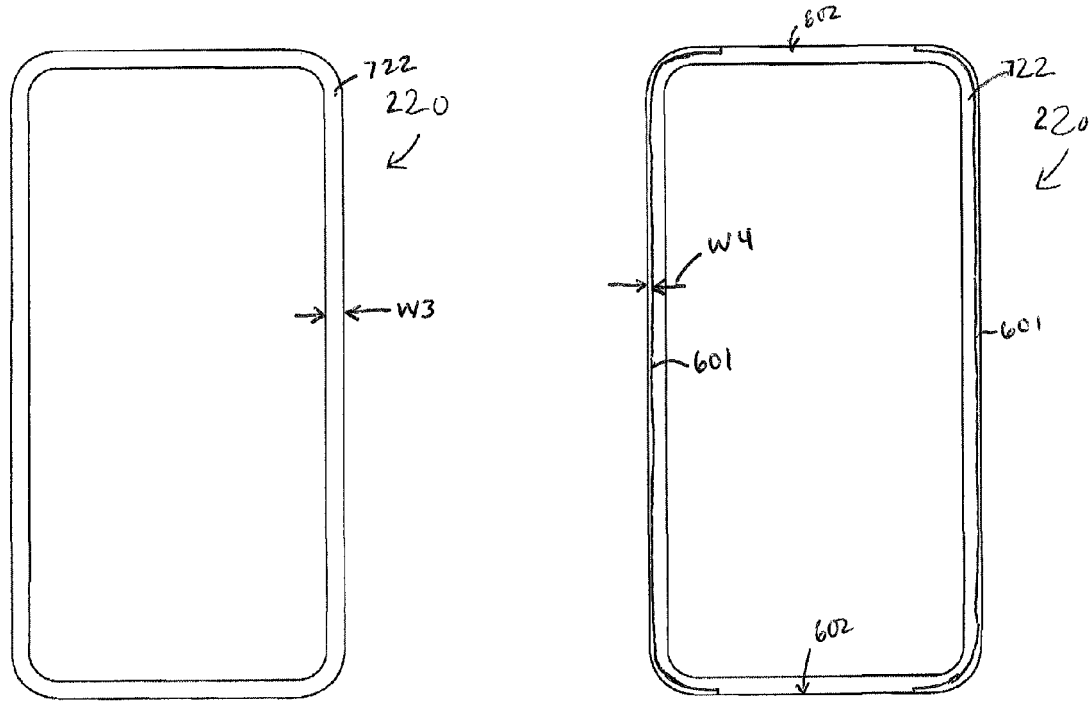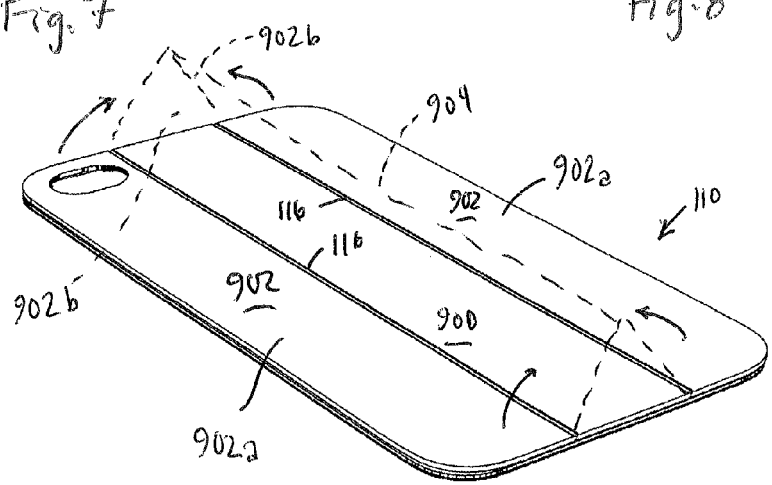

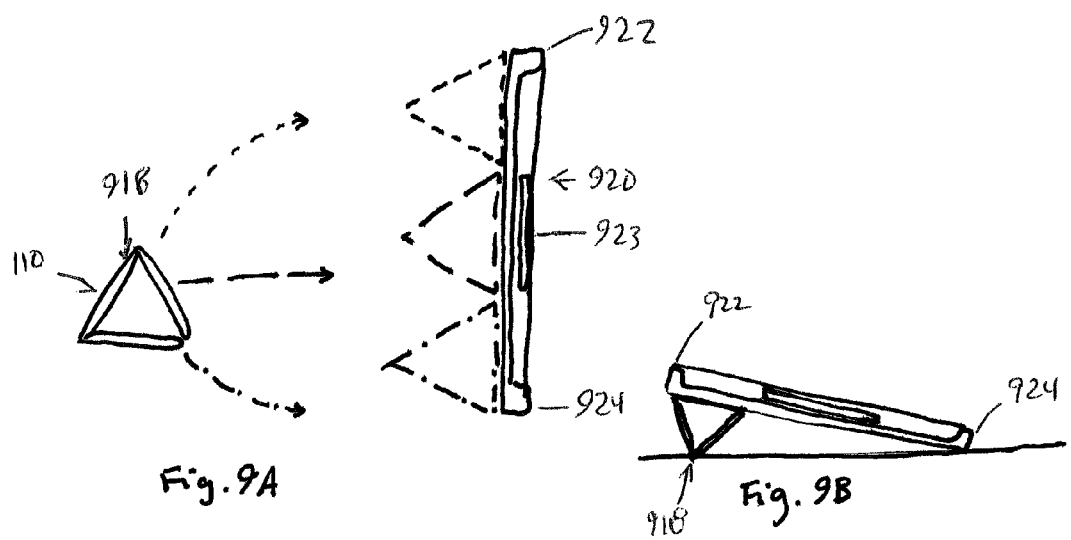
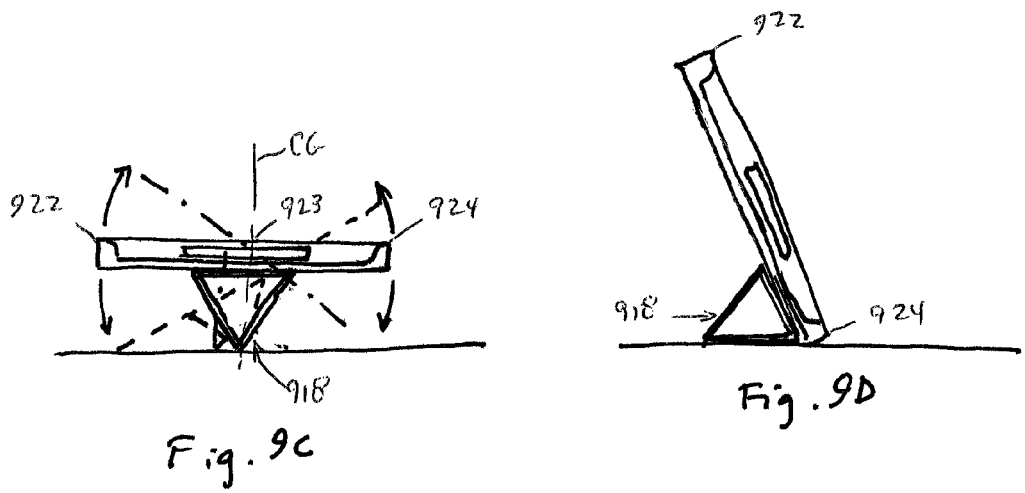

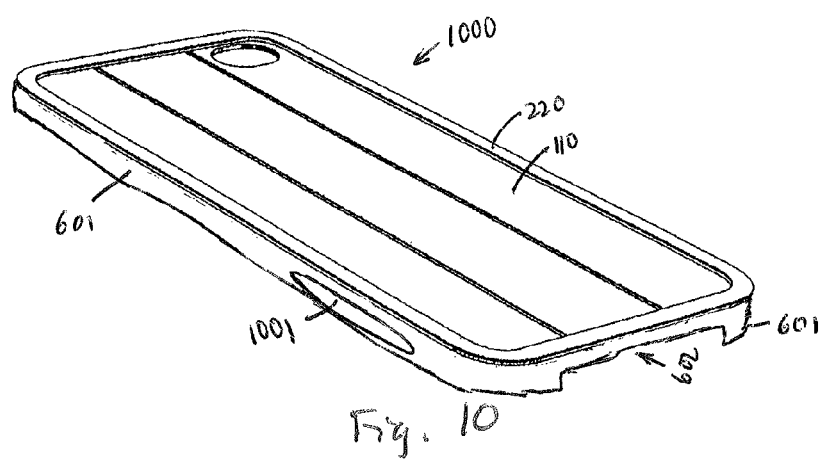
Fig. 10
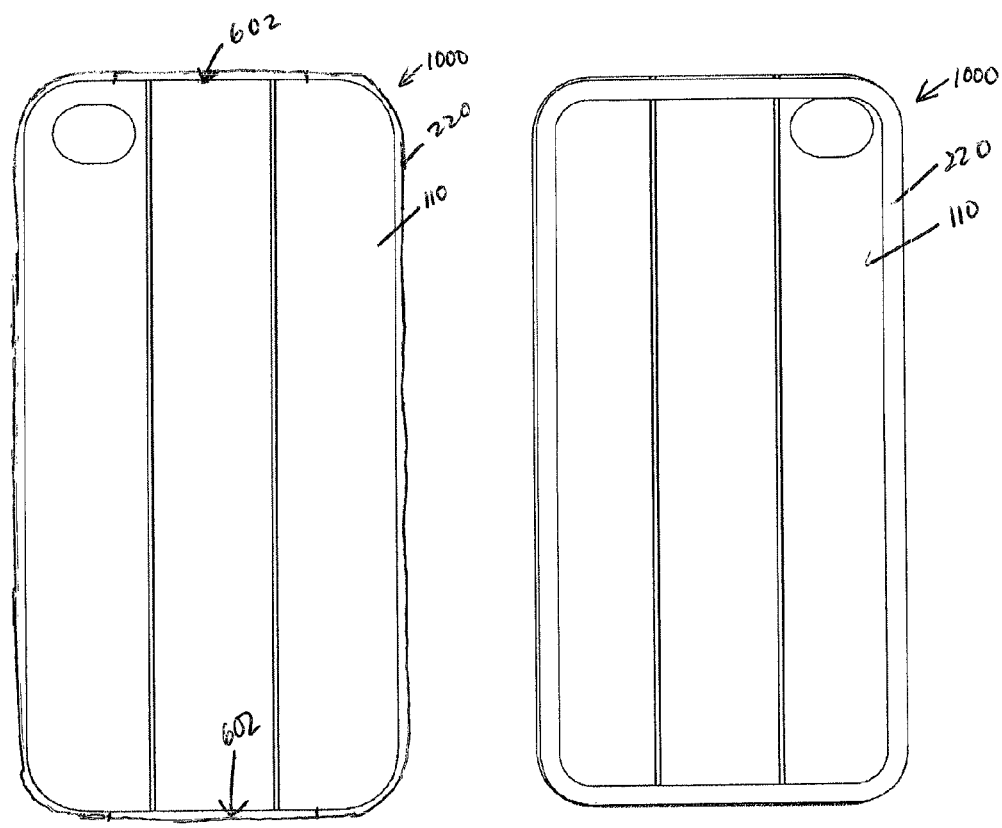
Fig. 11
Fig. 12

MAGNETIC STAND, MOUNT AND CORD WRAP FOR MOBILE DEVICES AND ACCESSORIES

RELATED APPLICATIONS

This application claims the benefit of U.S. Provisional Application Ser. No. 61/584,736, filed Jan. 9, 2012, entitled MAGNETIC MOBILE DEVICE ACCESSORY, MOUNT, AND CORD WRAP FOR MOBILE DEVICES AND ACCESSORIES, the entire disclosure of which is herein incorporated by reference.

FIELD OF THE INVENTION

This invention relates to the field of mobile device accessories, and in particular, to a magnetic mobile device accessory, mount, stand, cord wrap, bumpers and cases for mobile devices and their accessories.

BACKGROUND OF THE INVENTION

Mobile devices are ubiquitous in our modern world. Mobile devices include handheld computers, phones, e-tablets and other similar devices. Mobile devices have a display screen and a user interface (for example, a touch-screen and/or keypad). Users are able to conduct various activities with mobile devices, including receiving and sending text and messages, video display and game playing. Mobile devices can be furnished with a variety of cords, including ear pieces, power cords, accessory linkages and other cords. These cords can become a nuisance if left unwrapped and get easily knotted together or lost. Conventional cord wrapping accessories for mobile devices are typically an extra item that must be carried separately and pulled out in order to wrap cords, or they are attached to the device in such a way that adds bulk when not in use.

Mobile devices are by their nature small and easily handheld. Positioning the device to be used during work or pleasure activities creates a host of problems and employment of ad hoc props and attachments. Conventional mounting devices require a case or a platform on which the mobile device rests. These mounting devices rely on suction cups to mount devices on various surfaces, adhesives or other attachment systems. These mounting devices are easy to forget, adding time to what is ordinarily a simple task of organizing/wrapping/storing cords, and often provide only one function. Products that don't move with the mobile device (e.g., can be attached to a handheld phone) are something extra to remember and carry. Those products that do attach to the mobile device to provide functionality add bulk, even when not in use, and are not easily removable.

Tangled accessory cords can be a problem; including earbud/headphone cords, charging cords, and other wires. Another problem is not being able to see a mobile device's screen properly due to improper viewing angle relative to the screen, especially with overhead lighting. There is a need for an improved mobile device accessory that can provide a mobile device accessory, mount and cord wrap, either with or without a case.

The mobile display screen can be difficult to view in certain light conditions. Users are sometimes forced to prop the device in order to view the display while engaged in activities. One popular mechanism for holding the mobile device upright is a kickstand, an accessory or an attachment that props up a mobile device up so it stands and the user is not holding it upright.

It is therefore desirable to have an accessory that can organize the mobile device cords and thereby minimize tangles and loss. It is further desirable to provide a device that can organize the cords and function as a versatile kickstand and mounting accessory that can hold a mobile device upright and transition to provide an attachment to a wall or other vertical surface.

SUMMARY OF THE INVENTION

This invention overcomes the disadvantages of the prior art by providing a mobile device accessory functions as both an organizer for cords, a case for accessories and a mount for the devices. The accessory is sized accordingly to conform to the size and perimeter of the mobile device. The accessory has case frame and a flat panel that can be folded to form a triangular tube. The panel includes outer layers of material and a central layer of panel members that are constructed with magnets along the perimeter. In other embodiments, the panel members are constructed of magnetic materials or are composites that include magnetic materials. The outer material is a flexible and pliable natural and/or synthetic elastomeric polymer or an elastomeric composite (for example, neoprene or vinyl). The panel has at least two folds that provide for folding into a tube having a triangular profile. In other embodiments, the tube describes a square or other polygonal shape in profile.

When the accessory is folded into a folded orientation, the tube is secured and held by the magnetic attraction of the panel perimeter magnets and/or magnetic materials of the panel members. In other embodiments, the tube can be held by adhesives, snaps, hook and loop closures or another closure system. The formed triangular tube has several functions. The triangular tube can retain the cords and become a case for the cords and/or an organizer. The triangular tube can be magnetically attached to the back of the mobile device and become a support prop to hold the device upright or as a pivot point. The support function enables a user to move the device so as to deflect light and improve visibility of the display.

When the accessory is in a flattened orientation, that is to say the unfolded panel is within the case frame and attached to the device, the accessory enables the mobile device to be attached and detached from a vertical surface (for example, a white board, refrigerator or other magnetically responsive surface). This attachment is readily made and detachment is also readily effected. It is contemplated that one or more additional accessories in the folded orientation can be used to further adjust the angular orientation when fixed vertical, so as to improve display screen readability.

In an embodiment, the panel can function as storage for mobile device cords when the panel is folded along the folds such that internal perimeter magnets are attracted and thereby forms an enclosure. The outer elastomeric material cover can define a textured surface, a smooth surface or a composite thereof in whole or in part. When the panel is folded, an enclosed triangular tube is formed, creating a case for storing mobile device cords and can also function as a cord organizer. The panel is comprised of at least three panel members and at least two folds. The panel members are composed in part of internal magnets and can be a composite material that includes magnetic materials. The magnets enable the panel to form a triangular tube when folded based on the removable attractive force of the outer edges. The case frame is formed to the relative shape and dimensions of the respective mobile device, and sized with respect to the inner perimeter of the mobile device case. The panel is magnetically attracted to the case frame. The triangular tube formed by the folded panel can be magnetically attached to the case frame to form a relatively upright support for the mobile device. The formed triangular tube can serve as a pivot for the mobile device. The panel, when laid flat and attached to a case frame that is attached to the mobile device can function as an attachment point for the mobile device to a magnetically responsive vertical member.

The panel can be converted to a case for retaining cords by removing the panel from the case frame, placing the cord onto the panel and folding the panel to create the triangular tube. The tube is retained by the removably magnetic attraction of the respective panel edges. The tube with retained cords can then be attached to the mobile device and case frame to create a support for the mobile device.

BRIEF DESCRIPTION OF THE DRAWINGS

The invention description below refers to the accompanying drawings, of which:

FIG. 1 is a frontal view of a panel for a mobile device accessory according to an illustrative embodiment;

FIG. 2 is a frontal view of a case case frame for a mobile device accessory according to the illustrative embodiment;

FIG. 3 is an exploded view of the panel of FIG. 1 showing the composite layers according to the illustrative embodiment;

FIG. 7 is a frontal view of the case frame according to the illustrative embodiment;

FIG. 8 is a view of the reverse side of the case frame according to the illustrative embodiment;

FIG. 9 is a perspective view of the panel showing movement to a folded orientation according to the illustrative embodiment;

FIG. 9A is a side view of the panel folded into a triangular tube and attachment points on the mobile device according to the illustrative embodiment;

FIG. 9B is a side view of the panel folded into a triangular tube and attached at the relative top of the mobile device according to the illustrative embodiment;

FIG. 9C is a side view of the panel folded into a triangular tube and attached at the relative center of the mobile device according to the illustrative embodiment;

FIG. 9D is a side view of the panel folded into a triangular tube and attached at the relative bottom of the mobile device according to the illustrative embodiment;

FIG. 10 is a perspective view of the panel within the case case frame according to the illustrative embodiment;

FIG. 11 is a frontal view of the panel within the case case frame according to the illustrative embodiment;

FIG. 12 is a view of the reverse side of the panel within the case case frame according to the illustrative embodiment;

DETAILED DESCRIPTION

Figure 4:
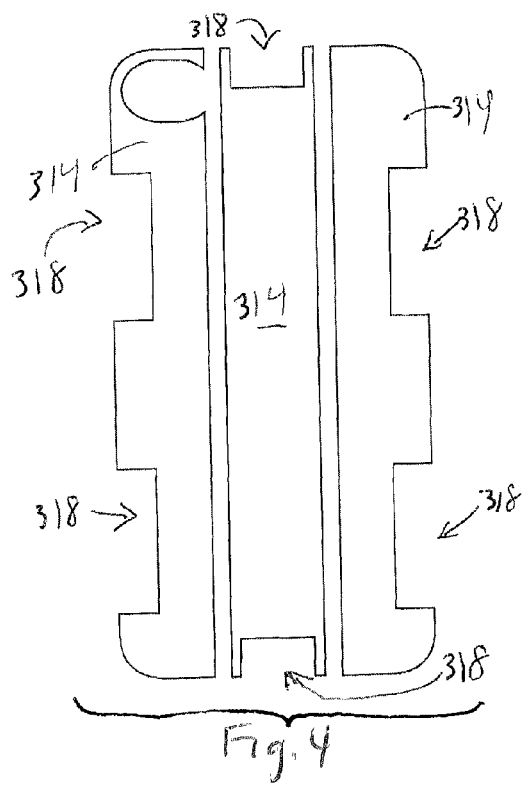
FIG. 4 is a frontal view of the panel members according to the illustrative embodiment.

FIG. 1 depicts an illustrative magnetic mobile device accessory 100 according to an embodiment. The mobile device accessory 100 can function as a mount, cord wrap, and case for mobile devices and their accessories. The mobile device accessory 100 functions as a collecting point for various cords to prevent tangled cords, including earbud/headphone cords, charging cords, and other wires. The mobile device accessory panel 100 provides for improved visibility of a mobile device's display screen. In addition, the present invention provides for the attachment of cords, wires, earbuds, headphones and/or the mobile device itself to metallic/magnetic surfaces. The mobile device accessory provides for head-to-head (e.g., two or more players) gaming on a single device (not shown) mounted on the mobile device accessory panel 110.

The illustrative panel 100 is a relatively flat assembly that is divided by two uniformly disposed folds 116 that form three magnetic panel members 115. In other embodiments, there can be more or less folds that form a plurality of magnetic strips having uniform or irregular widths. The panel member 115 of the panel 110 can be folded into thirds, creating a tubular enclosed triangular shape that is maintained by the magnetic panels. The panel member 115 can include a flexible outer layer material sandwiching a rigid panel in each of its three sections. The case member can attach around or cover part, or all of, the mobile device. It can be a "bumper" style case, or a more encompassing sheath. The overall length L1 of the panel 110 is approximately 113 mm. The overall width W1 is approximately 57 mm. The overall thickness of the mobile device accessory is approximately 2.5 mm. The overall weight of the panel 110 is approximately 3 ounces. In other embodiments, the dimensions can be larger or smaller, fatter or thinner. The mobile device accessory can be provided with a port or cutout 117 that has a length L2 of approximately 12 mm and a height H2 of approximately 7 mm. The cutout 117 serves as a port for the mobile device camera (not shown). It is contemplated that more than one camera port can be provided on the same side or opposite side. The material components of the mobile device accessory will be set forth more fully below. For larger mobile devices, such as tablet computers, the panel member 110 can be made in more than three sections, possibly along varying/multiple axes, thereby permitting various folding options. The panel member is generally rectilinear and conforms to the generally rectilinear shape of mobile devices. It is contemplated that when a mobile device having a non-rectilinear shape is presented that the panel will be shaped according to that device's non-rectilinear perimeter and shape.

FIG. 2 is an exemplary case frame 220 according to an illustrative embodiment. The case frame can be constructed of a magnetic material that provides a responsive force that creates an attachment to a mobile device. The case frame is sized appropriately to fit within the inner perimeter of the case for a mobile device. In other embodiments, the case frame can be a case that functions as the case frame while providing additional protection to the mobile device. The case frame 220 attaches to the outer periphery on one side of the mobile device. The panel 110 can be constructed to include at least one panel 115 member that is constructed with magnetic properties along its outer periphery to as to facilitate engagement between the panel 110 and case frame 220. When attached to its accompanying case frame or case (which adheres or snaps onto a mobile device), wires can be wrapped around the device, then secured and removed if desired. In other embodiments, an adhesive can be applied to one side of the case frame member 220 to securely affix the case frame member 220 to the mobile device. The case member can attach to the mobile device via friction, encasement, adhesive, or other attachments. The case can be composed of (or covered with) a flexible elastomeric material to function as a protective, resilient cover (e.g., a bumper case) for the mobile device. The bumper case material can be composed of magnetic responsive materials. In other embodiments, the panel can define a similar or the same dimensions as the case frame and the rest that is attached to it, positioned outside of the periphery of the case frame.

FIG. 3 is an exploded view of the panel showing the component layers. The outside layers 312 are comprised of a layer of natural, synthetic and/or a composite of natural and synthetic materials. The outer layers 312 enclose multiple rigid layer pieces 314. In another embodiment, the rigid layer pieces 314 can be three pieces that are disposed length-wise on equal thirds of the material layers 312.

The rigid layer pieces 314 can be provided with cut outs 318 so that magnets 319 can be disposed there in. While the magnets as shown are disposed along the perimeter of the mobile device accessory, it is expressly contemplated that they can be positioned away from the perimeters or that the entire rigid layer piece 314 can be formed of a magnetic material. The material layers 312 are secured to each other, sandwiching the rigid layer pieces 314 there between, in by heat sealing, adhesives, bonding, or the like.

FIG. 4 shows the rigid layer pieces 314 of FIG. 3 without the magnets. It is contemplated that the number, size and position of the magnets can vary in other embodiments.

Figure 5:
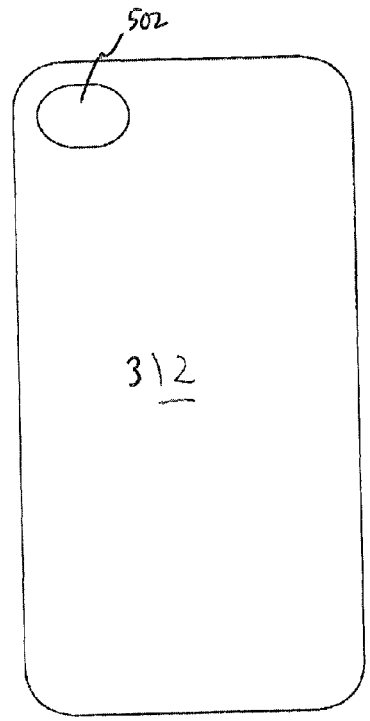
FIG. 5 is a frontal view of the outer material layer according to the illustrative embodiment.

FIG. 5 depicts one of the outer material layers 312 having an optional cutout 502. The outer layer can be constructed of natural, synthetic and/or composite elastomeric polymers. It is contemplated that the material can be provided with a textured and/or non-skid finish.

Figure 6:
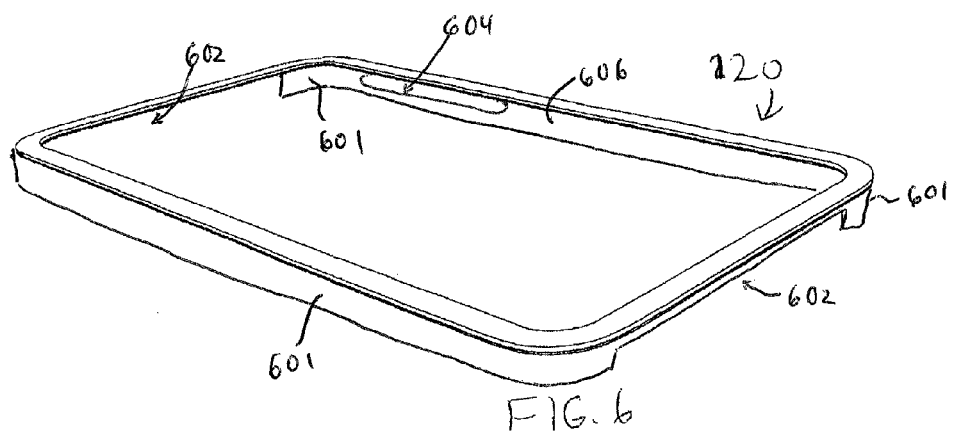
FIG. 6 is a perspective view of the case frame according to the illustrative embodiment.

FIG. 6 is a perspective view of the case frame 220 of FIG. 2, showing the perimeter wall 601 having end cutouts 602 and a side cutout 604. The perimeter cutouts provide access to various ports, connections and controls located on the exterior perimeter of the mobile device. It is contemplated that the perimeter wall 601 can be provided with more or less cutouts or none at all.

FIG. 7 is a top view of the case frame 220. The case frame top 722 as depicted has a uniform width W3 of approximately 5 mm. In other embodiments, it is contemplated that the width of the case frame top 722 can vary and/or be greater or lesser. The case frame top 722 can be embossed and/or covered with a design, logo, color pattern or be uniform in coloration.

FIG. 8 shows a bottom view of the case frame 220 and shows the perimeter wall 601 and cutouts 602. The thickness W4 of the perimeter wall as shown is approximately 1 mm. In other embodiments, it is contemplated that the thickness of the perimeter wall 601 can vary and/or be greater or lesser.

FIG. 9 shows a perspective view of an illustrative panel 110 having two side panel members 902 and a center panel member 901. The side panel members 902a can be laterally folded along the folds 116 so that the side panel members are folded from position 902a to position 902b and thereby create a seam 904. When folded into the folded orientation, the triangular tube thereby created is an enclosed space for the storage of cords. The triangular tube is a folded structure with a triangular cross section perpendicular to the elongated axis. The respective edges are attached and removably attached to each other. The side panel members 902 are held along seam 904 by the responsive force of magnets located along their perimeter, as set forth above. In other embodiments seam 304 can be created using various closure systems, including hook and loop attachments (for example, using Velcro®), snaps and buckles. The enclosed triangular tube created can be used to contain cords to prevent their entanglement and/or unwinding. The created tube can also be used as a mobile device accessory, as will be described below.

With respect to FIGS. 9A-9D, the panel 110 folded into a triangular tube 918 can be attached to the mobile device at different points for use as a kickstand and/or a pivot.

In FIG. 9A, a panel 110 has been folded to form the triangular tube 918 and can, thus, be attached to a mobile device 920 at the relative top 922, center 923 or bottom 924.

FIG. 9B depicts an illustrative mobile device 920 and a triangular tube 918 that has been attached to the device 920 at or near the top edge 922 so that the bottom edge 924 rests upon the surface. This defines a relatively low-angle position in the depicted arrangement.

Where the triangular tube 918 is attached to the device 922 at or near the center point 923, which is the center of gravity axis CG, the triangular tube serves as a pivot and the mobile device 920 can be rocked to rest upon the top 922 and the bottom 924 as shown in FIG. 9C.

The attachment of the triangular tube 918 at or near the relative bottom 924 of the mobile device 920 results in the mobile device 920 standing in an almost upright orientation, at a relatively high-angle position, as depicted in FIG. 9D.

FIG. 10 is a perspective view of the illustrative mobile accessory device 1000 composed of the panel 110 and case frame 220. The perimeter wall 601 of the case frame 220 has one or more end cutouts 602 and side cutouts 1001.

FIG. 11 is a view of the reverse side of the mobile accessory device 1000 of FIG. 10.

Likewise, FIG. 12 is a front view of the mobile device accessory 1000 of FIG. 10.

FIGS. 13A-I depict the mobile device accessory in use in a variety of functionalities. The depicted mobile device is a commercially available iPhone® from Apple Corporation of Cupertino, Calif. This is exemplary of a wide range of mobile devices that the mobile accessory device can be appropriately sized and formed to fit, including but not limited to e-tablets, e-readers and other mobile devices.

Figure 13A:
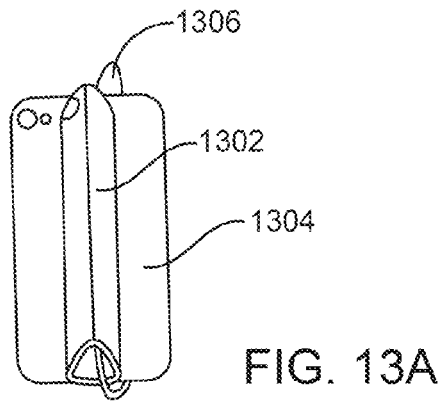
FIG. 13A is a perspective view of the accessory in the folded orientation attached to a mobile device according to the illustrative embodiment.

FIG. 13A shows the mobile device accessory 1302 in a folded orientation magnetically attached to the reverse side of a mobile device 1304. The folding panel of the mobile device accessory 1302 can be provided separately or as part of a kit, with the frame. Where the mobile device accessory 1302 is provided with the frame, the accessory 1302 is first removed from the frame and the cords 1306 are wrapped directly around the folded accessory 1302. The cords 1306 for the mobile device 1304 have been captured and retained within the triangular tube formed by the folded panels of the mobile device accessory 1302. While the cords 1306 as depicted in FIG. 13A are earpieces (for example, ear buds), it is expressly contemplated that the cords can also be connection cords, power cords or another accessory cord. The accessory 1302 remains in a flat orientation on the back of a mobile device 1304 until needed to secure cords 1306, tilt the device 1304, or mount the device 1304 or other accessories quickly. Users wrap their cords 1306 around the device 1304 and then snap the edges together to secure the cords.

Figure 13B:
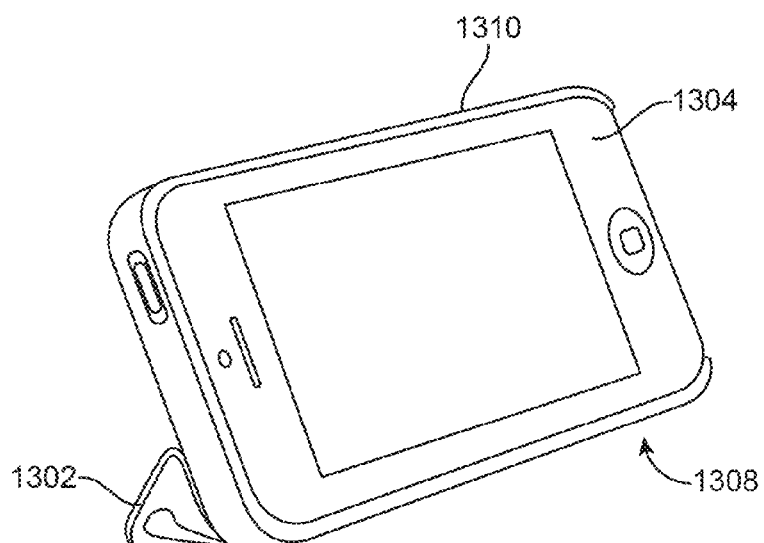
FIG. 13B is a perspective view of the accessory in the folded orientation attached to a mobile device as a support according to the illustrative embodiment.

FIG. 13B depicts the mobile device accessory 1302 in its folded orientation magnetically attached to the reverse side of a mobile device 1304 such that it is resting on the underlying surface 1308. In this embodiment, the mobile device accessory 1302 is used as a stand and a supporting prop (i.e., a kickstand) for the mobile device 1304. The mobile device 1304 is relatively upright and a user can readily view the display screen 1310.

Figure 13C:
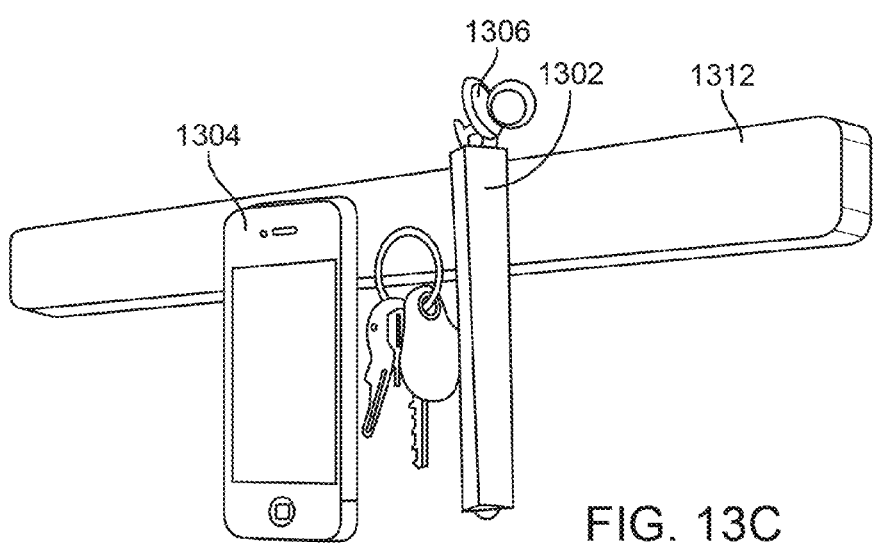
FIG. 13C is a perspective view of the accessory in the folded orientation retaining cords while attached to a strip mounted on a wall according to the illustrative embodiment.

FIG. 13C shows a mobile device 1304 magnetically attached to a magnetically conductive strip 1312. The mobile device accessory 1302 in its folded orientation is also attached to the strip 1312 and is retaining the mobile device cords 1306.

Figure 13D:
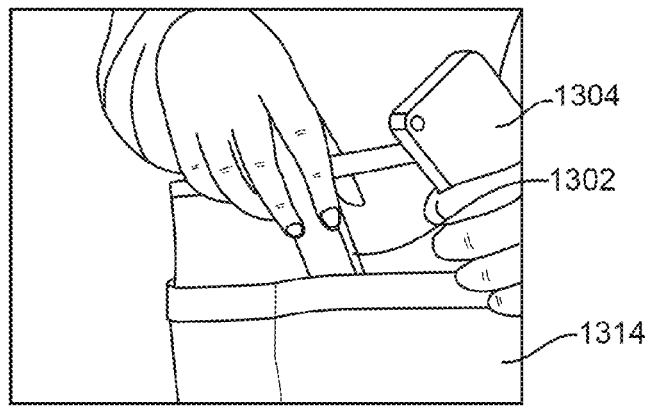
FIG. 13D is a view of an accessory being placed into a pocket when not in use according to the illustrative embodiment.

The mobile device accessory 1302 can be readily stored in a pocket 1314 on the person or accessory bag (e.g., a purse) of a user when not in use in the folded orientation or in the flat orientation, as shown in FIG. 13D.

Figure 13E:
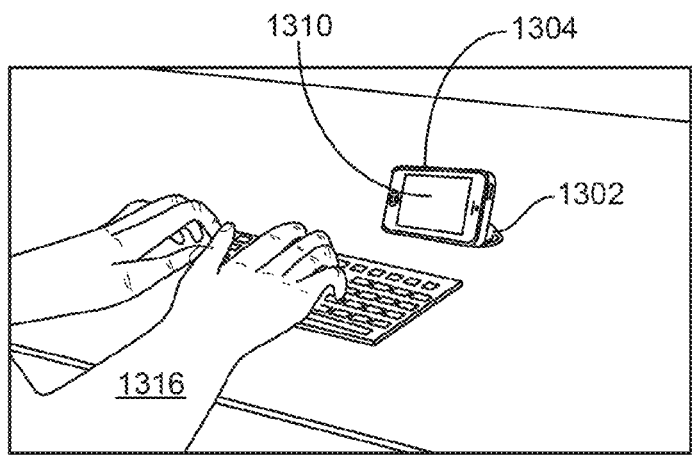
FIG. 13E is a perspective view of the accessory in the folded orientation attached to a mobile device as a support according to the illustrative embodiment.

FIG. 13E shows the mobile device accessory used as a stand as set forth in FIG. 13B, to provide an easily read display surface 1310 for the user 1316 while the user is performing data entry tasks.

Figure 13F:
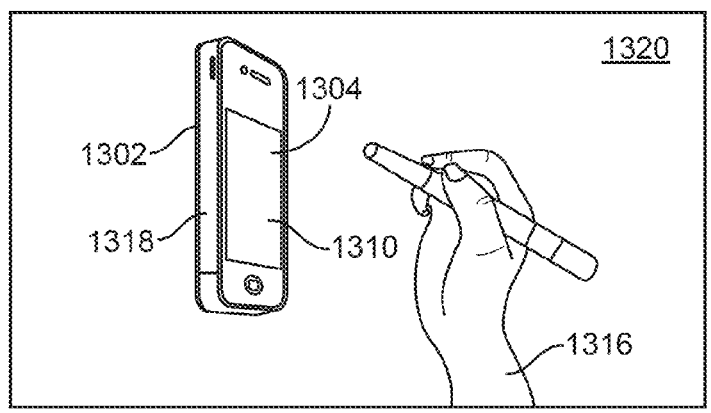
FIG. 13F is a perspective view of the accessory in the flat orientation attached to a mobile device as a support on a vertical surface according to the illustrative embodiment.

FIG. 13F depicts the mobile device 1302 with the attached mobile device accessory 1302 in a case frame 1318 magnetically attached to a vertical surface 1320 (for example, a white board or a refrigerator) so that the user 1316 can refer to information on the display 1310 while performing a presentation.

Figure 13G:
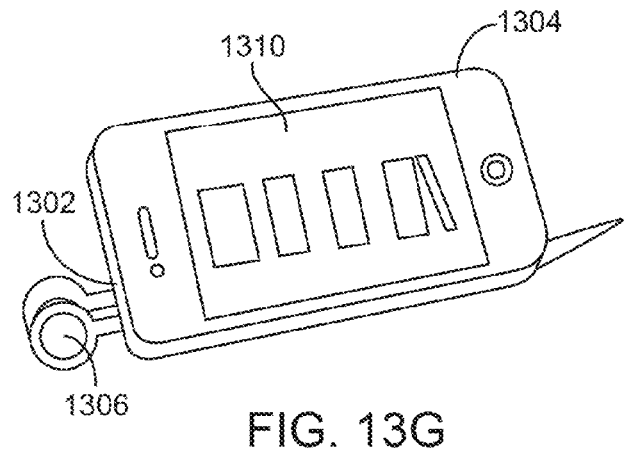
FIG. 13G is a perspective view of the accessory in the folded orientation retaining cords attached to a mobile device as a support according to the illustrative embodiment.

The mobile device 1304 with the folded mobile device accessory 1302 of FIG. 13B is depicted in FIG. 13G with the cords 1306 for the mobile device captured within its folds while acting as a supporting prop for the device.

Figure 13H:
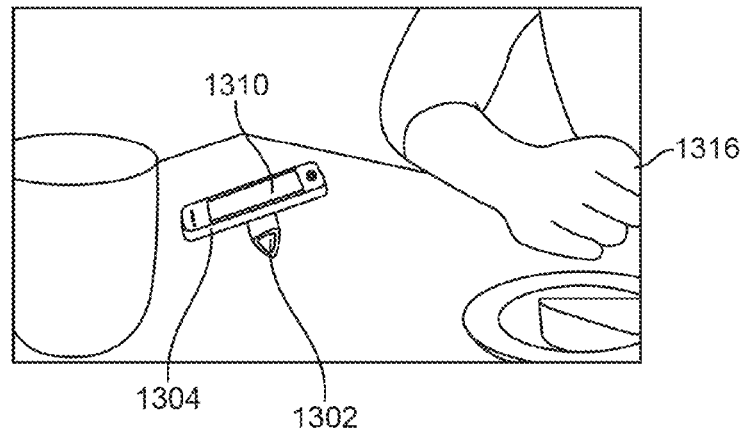
FIG. 13H is a perspective view of the accessory in the folded orientation used as a pivot.

In FIG. 13H, a user 1316 is discussing information with other parties (not shown) using a mobile device 1304 that has an attached accessory 1302. In this illustrative embodiment, the device 1304 rests upon the triangular tube formed by the folded accessory 1302 with the triangular tube positioned at or near the center, as set forth more fully in FIG. 9C above. This orientation makes the display 1310 easier to read. This orientation allows for new uses of the mobile device's accelerometer/gyroscope for gaming and other applications, by acting as a pivot point, letting the device "seesaw" back and forth between game players.

Figure 13I:
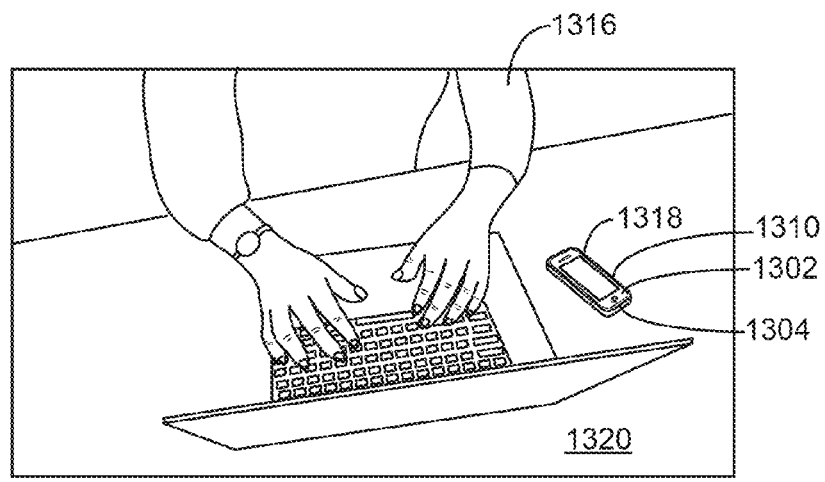
FIG. 13I is a perspective view of the device held within the accessory on a flat surface according to the illustrative embodiment.

Referring to FIG. 13I, the device 1304 has the accessory 1302 within its case frame 1318 and attached to the device and is resting on a level surface 1320 so that the display 1310 is visible while the user 1316 performs data entry tasks. When the surface 1320 is magnetically conductive, the device 1304 will be securely held to the surface by magnetic attraction and not easily knocked aside or damaged accidently.

Embodiments of the present mobile device accessory include a flat panel with embedded magnets that can fold together to form a channel for cords. The edges of the panel magnetically snap together to form a triangular tube. Other methods of attaching (such as hook and loop closures) can also be used for forming the tubular space and connecting with either the case frame or case member.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the number of magnets within the panel members can vary greater or lesser. The panels can be formed of composite materials that include magnetic materials. The outer covering of the panels can be composed of a natural, synthetic and/or composite material (for example, neoprene, nylon, leather, synthetic leather and the like). More folds can be provided such that the folded orientation defines in profile a polygonal shape having four or more sides. The folds can be aligned to the long axis of the panel, or perpendicular to the long axis, so as to be arranged to the shorter axis. More than one panel can be provided, and for larger tablets, a plurality of panels can be provided as part of a kit. The mobile device accessory can be provided as part of a kit having a case frame, panel, and other accessories, including a mount for a key ring or other attachment points. The panel and case frame can be provided with designs, colors and/or panels. Accordingly, this description is meant to be taken only by way of example, and not to otherwise limit the scope of this invention.

What is claimed is:

1. A system for attaching a mobile device to a vertical member having magnetic attraction comprising:
   a panel having a plurality of folds;
   an outer cover over the panel;
   a plurality of magnetic components attached to one of the panel and the cover; and
   a case frame formed of magnetically responsive material and sized to attach to the perimeter of the mobile device;
   a material for attaching the case frame to the mobile device;
   at least one of the plurality of magnetic components being positioned to hold the panel and outer cover against the mobile device; and
   at least one of the plurality of magnetic components being positioned to hold the cover against a vertical member, and having sufficient magnetic strength to hold both the cover and the mobile phone.

2. The system of claim 1 wherein:
   the panel is sized to cover the display of the mobile device, the panel having two or more folds, and the panel being rigid in-between the folds;
   the panel being foldable into a triangular tube shape;
   the triangular tube shape defining a central opening through which multiple loops of a mobile device cord can be wrapped, with the cord being wrapped around inner and outer surfaces of the triangular tube.

* * * * *